(12) United States Patent
Hall et al.

(10) Patent No.: US 9,004,263 B2
(45) Date of Patent: Apr. 14, 2015

(54) CONVEYOR DRIVE WITH INTEGRATED CONTROLLER

(71) Applicant: Milwaukee Electronics Corporation, Milwaukee, WI (US)

(72) Inventors: David V. Hall, Cookeville, TN (US); James Scholler, Brookfield, WI (US)

(73) Assignee: Milwaukee Electronics Corporation, Milwaukee, WI (US)

( * ) Notice: Subject to any disclaimer, the term of this patent is extended or adjusted under 35 U.S.C. 154(b) by 0 days.

(21) Appl. No.: 13/689,248

(22) Filed: Nov. 29, 2012

(65) Prior Publication Data

US 2013/0134017 A1  May 30, 2013

Related U.S. Application Data

(60) Provisional application No. 61/565,248, filed on Nov. 30, 2011.

(51) Int. Cl.
*B65G 43/00* (2006.01)
*B65G 13/07* (2006.01)
*B65G 13/06* (2006.01)

(52) U.S. Cl.
CPC ............. *B65G 43/00* (2013.01); *B65G 13/07* (2013.01); *B65G 13/06* (2013.01)

(58) Field of Classification Search
USPC ........... 198/781.03, 781.09, 781.01, 790, 834
See application file for complete search history.

(56) References Cited

U.S. PATENT DOCUMENTS

| | | | |
|---|---|---|---|
| 5,107,532 A * | 4/1992 | Hansen et al. ................... 379/25 |
| 5,186,308 A * | 2/1993 | Munro ........................... 198/572 |
| 5,213,201 A * | 5/1993 | Huber et al. ............. 198/781.06 |
| 5,912,541 A | 6/1999 | Bigler et al. |
| 6,420,846 B1 | 7/2002 | Wolfe |
| 6,647,310 B1 * | 11/2003 | Yi et al. ......................... 700/121 |
| 7,102,318 B2 | 9/2006 | Miura et al. |

(Continued)

FOREIGN PATENT DOCUMENTS

| WO | 2006102691 | 10/2006 |
|---|---|---|
| WO | 2010150527 | 12/2010 |

OTHER PUBLICATIONS

"Technical Doumentation: Product Manual, Intelligent Compact Drive, IcIA IFEN DeviceNet", Document 0098441113425, Edition: V1.02, Dec. 2007, Berger Lahr GmbH & Co. KG, Breslauer Str. 7, D-77933 Lahr.

(Continued)

*Primary Examiner* — Gene Crawford
*Assistant Examiner* — Lester Rushin
(74) *Attorney, Agent, or Firm* — Boyle Fredrickson, S.C.

(57) ABSTRACT

A drive unit for a roller conveyor assembly having a motor and an integrated motor controller. The controller is mounted on a circuit board and connected to the rear of the motor housing. A cover for the controller substantially encloses the controller. An opening in the cover allows access to a terminal block from the controller. The terminal block receives wiring to external devices and to other zone controllers. Wiring between the circuit board for the controller and the motor is performed as a step in the assembly of the integrated motor and controller. The motor and controller are configured to be mounted below the rollers and between the side frames of a conveyor assembly. An output shaft from the motor is coupled to the rollers to power the conveyor assembly.

18 Claims, 5 Drawing Sheets

(56) References Cited

U.S. PATENT DOCUMENTS

| | | |
|---|---|---|
| 7,166,981 B2 * | 1/2007 | Kakutani et al. ............. 318/567 |
| 7,360,638 B2 | 4/2008 | Ko et al. |
| 7,511,443 B2 | 3/2009 | Townsend et al. |
| 7,537,107 B2 * | 5/2009 | Hall ............................ 198/781.1 |
| 7,622,686 B2 | 11/2009 | Wolfschaffner |
| 7,671,551 B2 | 3/2010 | Bi et al. |
| 7,673,738 B2 | 3/2010 | McConnell |
| 2003/0089580 A1 | 5/2003 | Pfeiffer |
| 2004/0145324 A1 | 7/2004 | Ross et al. |
| 2004/0155619 A1 * | 8/2004 | Hauselt et al. ................ 318/439 |
| 2005/0000416 A1 * | 1/2005 | Prentice et al. ............... 118/300 |
| 2008/0116041 A1 | 5/2008 | Hall |

OTHER PUBLICATIONS

"All-in-One Solution for Programmable Motion Control," Power Systems Design, Oct. 2008, p. 68.

* cited by examiner

CONVEYOR DRIVE WITH INTEGRATED CONTROLLER

CROSS-REFERENCE TO RELATED APPLICATIONS

This application claims priority to U.S. provisional application Ser. No. 61/565,248, filed Nov. 30, 2011, the entire contents of which are incorporated herein by reference.

BACKGROUND OF THE INVENTION

This invention relates generally to a system and device for conveying. More specifically, the invention relates to a unit handling roller conveyor system driven by an external direct current ("DC") motor with an integrated controller.

Unit handling roller conveyor systems generally comprise sections, or zones, made up of conveyor frames supporting individual rollers. The rollers of each zone are driven by a motor, and transport items from one end of the zone to the other. Each zone may have separate controls, and the zones and associated controls are connected with other zones to form a larger conveying system. Further, a central controller may oversee and control operation of the conveying system.

Coordination between zones requires communication of commands as well as feedback related to the operating status and loading between zones. Each zone may receive, for example, a command related to the speed at which the zone is to be driven, the direction of travel for the zone, and status of the presence or absence of items in the zone or in one or more adjacent or near-by zones. Historically, a separate conductor has been provided to carry individual signals between zones. As the size and complexity of conveying system has increased, the size and complexity of the cabling has similarly increased. The increasing amount of wiring adds time and cost to installations and requires mounting considerations to secure the wire harnesses to the conveyor system.

In recent years, networked communications have been introduced to reduce the amount of wiring in the conveyor system. The zones may be interconnected via a suitable communications cable, significantly reducing the amount of wiring required within the conveyor system. Although networked communications reduces zone-to-zone wiring, it generally does not reduce the amount of wiring within a zone. Within each zone, the network is connected to a controller having a communication interface configured to transmit and/or receive data from the network. From the controller, discrete wiring is still required between the zone controller and each of the motors and sensors in the zone.

Thus, it is desirable to provide a conveying system with further simplified wiring to reduce the time and expense associated with materials and installation.

SUMMARY OF THE INVENTION

The subject matter disclosed herein relates to a drive motor for a roller conveyor assembly having an integrated motor controller. The controller is mounted on a circuit board and connected to the rear of the motor housing. A cover for the controller substantially encloses the controller. An opening in the cover is configured to allow access to a terminal block from the controller. The terminal block receives wiring to external devices and to other zone controllers. Wiring between the circuit board for the controller and the motor is performed as a step in the assembly of the integrated motor and controller, thereby reducing the installation time and cost and eliminating the lead assembly required between an external controller and the motor. The motor and controller are typically configured to be mounted below the rollers and between the side frames of a conveyor assembly. An output shaft from the motor is coupled to the rollers to power the conveyor assembly.

According to one embodiment of the invention, a roller conveyor assembly includes a plurality of rollers, a frame including a pair of spaced apart frame members, a mounting bracket, and a drive unit. Each of the rollers is rotatably mounted between the pair of frame members, and the mounting bracket is configured to hold a drive unit between the pair of frame members and below the rollers. The drive unit includes a motor and a controller. The motor includes a stator configured to receive an applied voltage, a rotor configured to rotate as a function of the applied voltage, a housing containing the stator and the rotor, and an output shaft operatively connected to the rotor. The housing has a first end, a second end opposite the first end, and a side wall extending between the first and second ends. The output shaft extends through an opening in the first end of the housing. The controller includes a circuit board mounted to an outer surface of the housing of the motor, the circuit board including a logic circuit configured to control operation of the motor, a terminal block mounted to the circuit board and configured to receive electrical conductors transmitting at least one of an input and an output signal to the logic circuit, and a cover enclosing the circuit board and connected to the motor housing. The cover has an opening providing access to the terminal block.

According to another aspect of the invention, the circuit board of the controller is mounted to the outer surface of the second end of the housing, and the second end of the housing is configured to be a heat sink for the logic circuit.

According to yet another aspect of the invention, at least one flexible drive member may be operatively connected between the output shaft and one of the rollers. The drive unit includes a sheave, having at least one groove, mounted to the output shaft. Each groove is configured to receive one of the flexible drive members. At least one roller also includes a groove configured to receive one of the flexible drive members.

According to still another aspect of the invention, the inputs on the terminal block are configured to receive a command signal and an input voltage. The logic circuit is configured to selectively provide a voltage to the motor responsive to the command signal. The motor may also include a position sensor generating a position signal corresponding to an angular position of the motor. The position signal is provided to the logic circuit for control of the motor.

According to another embodiment of the invention, a conveyor drive unit for a roller conveyor assembly is disclosed. The roller conveyor assembly includes a plurality of rollers mounted between a pair of spaced apart frame members. The conveyor drive unit includes a housing having a first end, a second end, and a side wall extending between the first end and the second end. A motor is operatively mounted within the housing and includes an output shaft extending from a first end of the housing. A controller is mounted to an outer surface of the second end of the housing and is configured to control operation of the motor, and the second end of the housing is configured to provide a heat sink for the controller. A cover is connected to the second end of the housing to enclose the controller.

According to another aspect of the invention, the controller includes a circuit board, a terminal block mounted on the circuit board, a memory device mounted to the circuit board and configured to store a plurality of instructions, and a processor configured to execute the plurality of instructions to control operation of the motor. The circuit board is mounted to the outer surface of the second end of the housing, and the terminal block is aligned with an opening in the housing and configured to transmit at least one of an input signal and an output signal between the controller and another device.

According to yet another aspect of the invention, the roller conveyor assembly is configurable to operate in one of a plurality of modes, and the conveyor drive unit further includes a selector configured to generate a signal corresponding to the operating mode. The terminal block may be a network connector, and a network interface may be connected in series between the network connector and the processor. The input and output signals may then be transmitted via network messages.

According to still other aspects of the invention, the terminal block includes at least one terminal configured to receive a command signal, and the processor executes a motor control module to generate a voltage signal to control operation of the motor responsive to the command signal. At least one flexible drive member may be operatively connected between the output shaft and one of the rollers. The drive unit may include a sheave mounted to the output shaft. The sheave includes at least one groove, and each groove is configured to receive one of the flexible drive members. At least one roller includes a groove configured to receive one of the flexible drive members.

According to yet another embodiment of the invention, a conveyor drive unit for a roller conveyor assembly is disclosed. The roller conveyor assembly is configured to be installed in a conveyor system having a plurality of roller conveyor assemblies and includes a plurality of rollers mounted between a pair of spaced apart frame members. The conveyor drive unit includes a housing having a motor housing portion, a controller housing portion, and a mounting means for securing the housing to a mounting bracket positioned below the rollers. A low voltage DC motor is operatively mounted within the motor housing portion and has an output shaft extending from one end of the housing. A controller is mounted within the controller housing portion. The controller includes a first input configured to receive a DC voltage, a second input configured to receive a command signal, and a logic circuit configured to selectively provide the DC voltage to the low voltage DC motor as a function of the command signal.

According to another aspect of the invention, the controller may include at least one additional input configured to receive a feedback signal from a sensor detecting an operating condition corresponding to the roller conveyor assembly on which the controller is mounted. The controller may also include a third input configured to receive a signal from another roller conveyor assembly in the conveyor system. The conveyor drive unit may include a network interface where each of the second and third inputs is received via the network interface.

These and other aspects and objects of the present invention will be better appreciated and understood when considered in conjunction with the following description and the accompanying drawings. It should be understood, however, that the following description, while indicating representative embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 3 is a perspective view of the motor with an integrated controller as shown in

FIG. 1;

Figure 1:
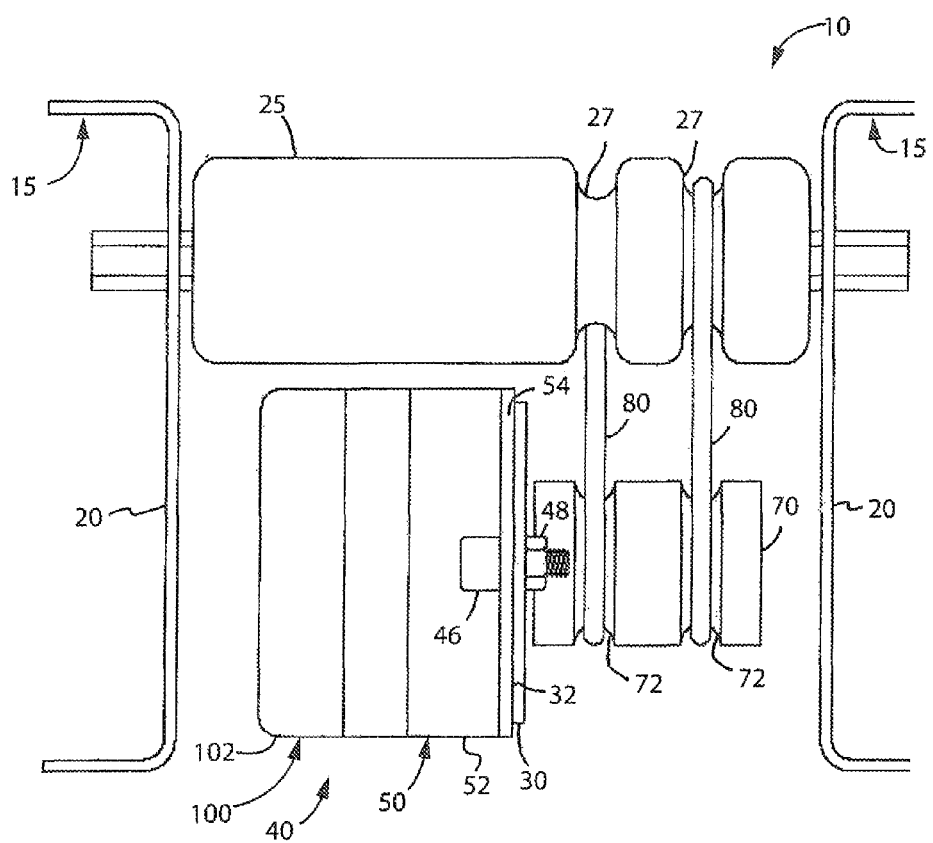
FIG. 1 is a lateral sectional view of a conveyor assembly section incorporating a motor and integrated controller according to one embodiment of the present invention.

In describing the representative embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENT

The various features and advantageous details of the subject matter disclosed herein are explained more fully with reference to the non-limiting embodiments described in detail in the following description.

Referring to FIG. 1, a roller conveyor assembly 10 according to one embodiment of the invention is disclosed. The conveyor assembly 10 generally makes up a section, or zone, of an overall roller conveyor system incorporating a large number of similarly constructed sections or zones. Each conveyor assembly 10 is formed of a conveyor frame 15 having a pair of spaced apart structural frame members 20 with a series of rollers 25 disposed between the frame members 20. In the illustrated embodiment, the frame members 20 are in the form of C-shaped channel members, although it is understood that any other satisfactory shape or type of frame member may be employed. The rollers 25 are rotatably supported by and between frame members 20 as is well known in the art.

The roller conveyor assembly 10 also includes a mounting bracket 30 configured to receive a drive unit 40 between the spaced apart frame members 20. As shown in FIG. 1, the mounting bracket 30 includes a mounting surface 32 oriented generally parallel with each of the frame members 20. The mounting surface 32 is located between the frame members 20 and below the rollers 25. The mounting bracket 30 further includes at least one support member (not shown) connecting the mounting surface 32 to at least one of the spaced apart frame members 20. According to one embodiment of the invention, a first and a second support member extend from the mounting surface 32 to one of the frame members 20 as a C-shaped channel. The space between the first and second support members is sufficient to receive either the drive unit 40 or the drive members connected to the drive unit 40. Optionally, a single support member may extend from one of the frame members 20 to the mounting surface 32 or one support member may extend from each frame member 20 to the mounting surface 32.

The drive unit 40 is configured to be secured to the mounting surface 32 between the frame members 20 and includes a drive motor 50 and an integrated controller 100. As illustrated in FIG. 1, the drive motor 50 has a large diameter and a short axial length, which enables the drive motor 50 to be mounted between the frame members 20. According to one embodiment of the invention, the drive motor 50 has a 3¼" diameter and a 1½" axial length. The drive motor 50 may be a low voltage (i.e., approximately 48V or less), brushless, DC motor. It is understood, however, that any other satisfactory short, flat "pancake" type motor may be employed. Representatively, the drive motor 50 may include a housing 52 having a first end 51, a second end 53, and a generally cylindrical side wall 55 extending between the first end 51 and the second end 53. The housing 52 may also have a pair of mounting tabs 54, shown in FIG. 3, which are adapted for placement against the mounting surface 32. A hole 56 in the mounting tab 54 may be aligned with a hole in the mounting surface 32 to receive, for example, a bolt 46. A nut 48 is then attached to the bolt to secure the drive motor 50 to the mounting surface 32. Optionally, any other suitable mounting method, as would be understood in the art, may be used to secure the drive motor 50 to the mounting surface 32.

A shaft 60 extends from an opening 61 in one end of the housing 52 and through a hole in the mounting surface 32. The shaft 60 may be supported relative to the housing 52 by one or more sets of ball bearings 58, as illustrated in FIG. 4.

The drive motor 50 may be designed to operate at relatively high torque and relatively low speed. According to one embodiment of the invention, the motor 50 is configured to operate at 5 inch-pounds of torque at 280 RPM. Thus, the motor 50 may drive the roller 25 without the need for speed reduction gearing. Noise reduction is achieved by the elimination of the gears typically associated with a gear drive, as well as operating at a reduced speed. The illustrated drive motor 50 operates at a higher electro-mechanical efficiency than a high-speed, small diameter motor due to the use of larger gauge wire in the windings and to low eddy current losses in the motor 50. Additional improvements in efficiency result from elimination of frictional losses associated with gearing required with small, high speed motors.

Figure 2:
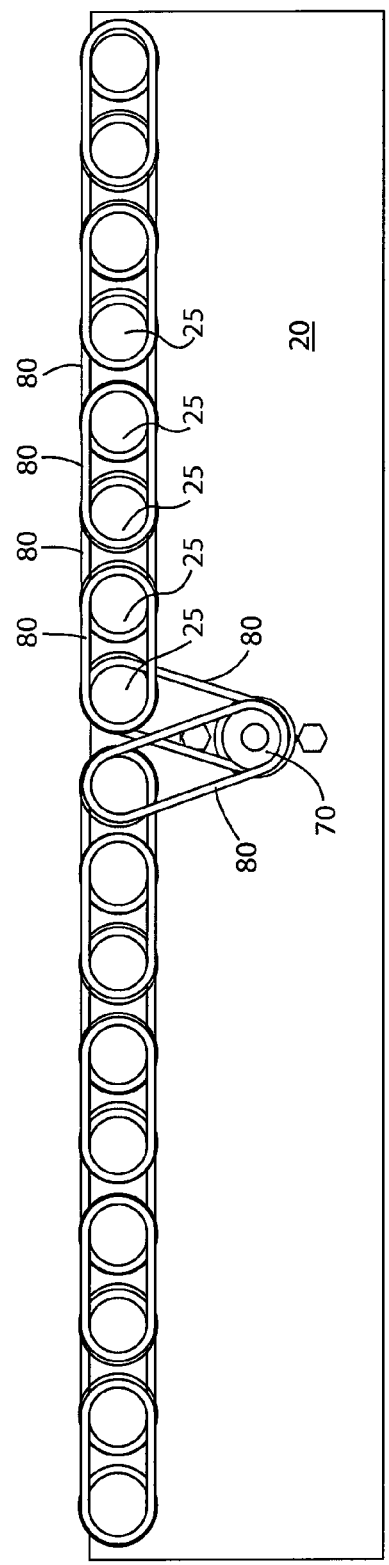
FIG. 2 is a longitudinal sectional view of a conveyor assembly section according to one embodiment of the present invention.

A drive member, which may be in the form of a sheave 70, or alternatively a pulley or sprocket, is affixed to the shaft 60 of the drive motor 50. Grooves 72 in the sheave 70 are designed to match grooves 27 in the rollers 25. The diameter of the sheave 70 is dependent on the desired operating speed of the rollers 25. Flexible drive members, such as elastomeric drive belts, 80 are engaged within the grooves, such as 27 and 72, and drivingly connect the sheave 70 to an adjacent pair of rollers 25. Similar drive belts 80 function to drivingly connect each roller 25 to another adjacent roller 25. Elastomeric drive belts 80 may be formed of a urethane material, although it is understood that any other satisfactory material may be employed. Referring also to FIG. 2, the two flexible drive belts 80 connected to sheave 70 and to the two driven rollers 25 form a "V" configuration. The two driven rollers 25 are driven through rotation of the sheave 70 by the drive motor 50. The elastomeric belts 80, connected between each of two adjacent rollers 25, drive each of the adjacent rollers 25 from the driven rollers 25. The use of the specially designed sheave 70 and elastomeric drive belts 80 eliminates the need for a gearbox between the motor output and the driven rollers 25. As an alternative to elastomeric drive belts 80, it is understood that any other satisfactory flexible drive member may be employed for transferring rotation from the motor drive member to the rollers 25. For example, the flexible drive member may be in the form of a belt or chain, and the motor drive member may be in the form of a pulley (in the case of a belt-type drive member) or a sprocket (in the case of a chain-type drive member). Rather than direct engagement with the driven rollers 25, each flexible drive member may be engaged with a pulley or sprocket that is mounted to the driven roller shaft.

Figure 3:
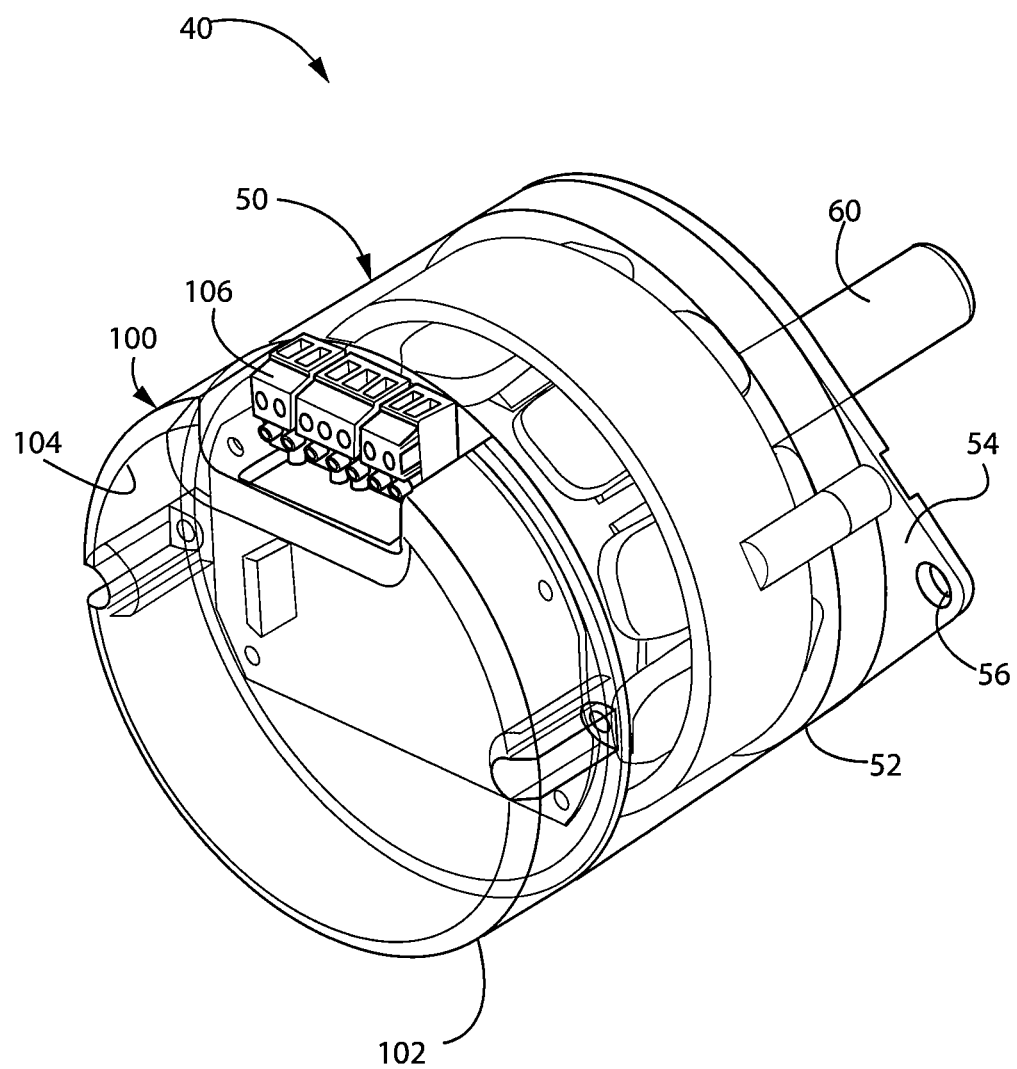
Figure 4:
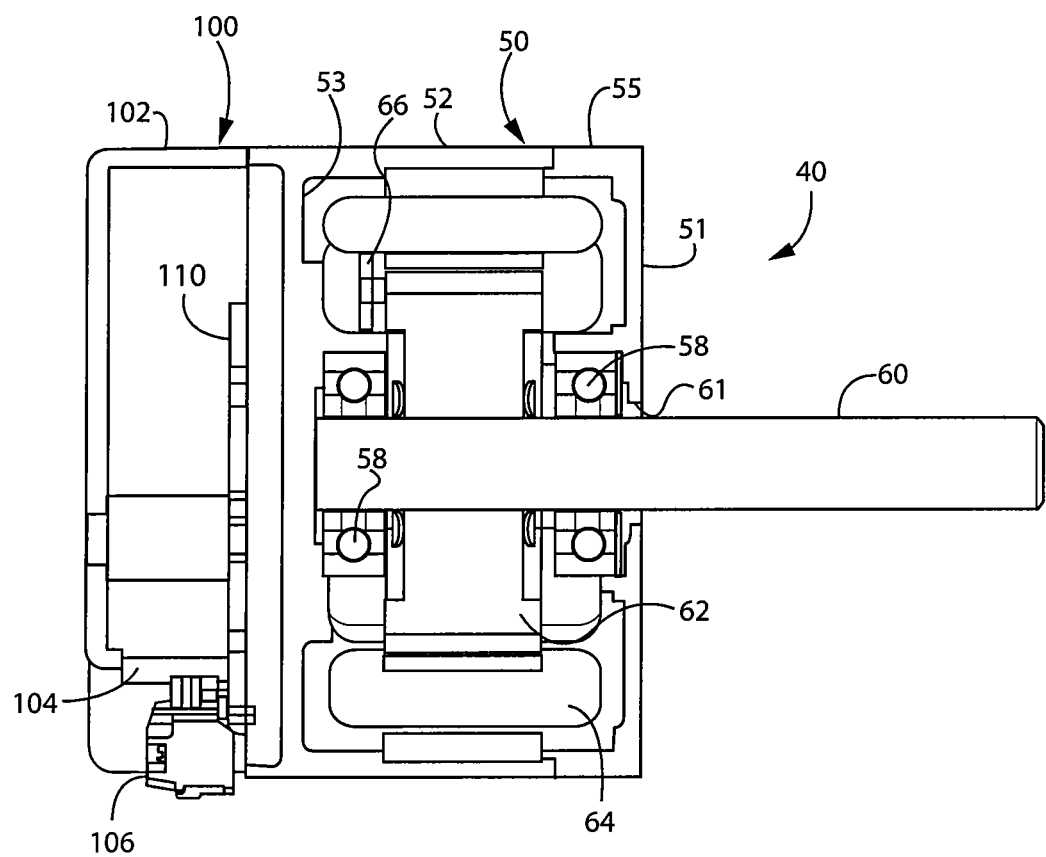
FIG. 4 is a sectional view of the motor and integrated controller as shown in FIG. 3.
Figure 5:
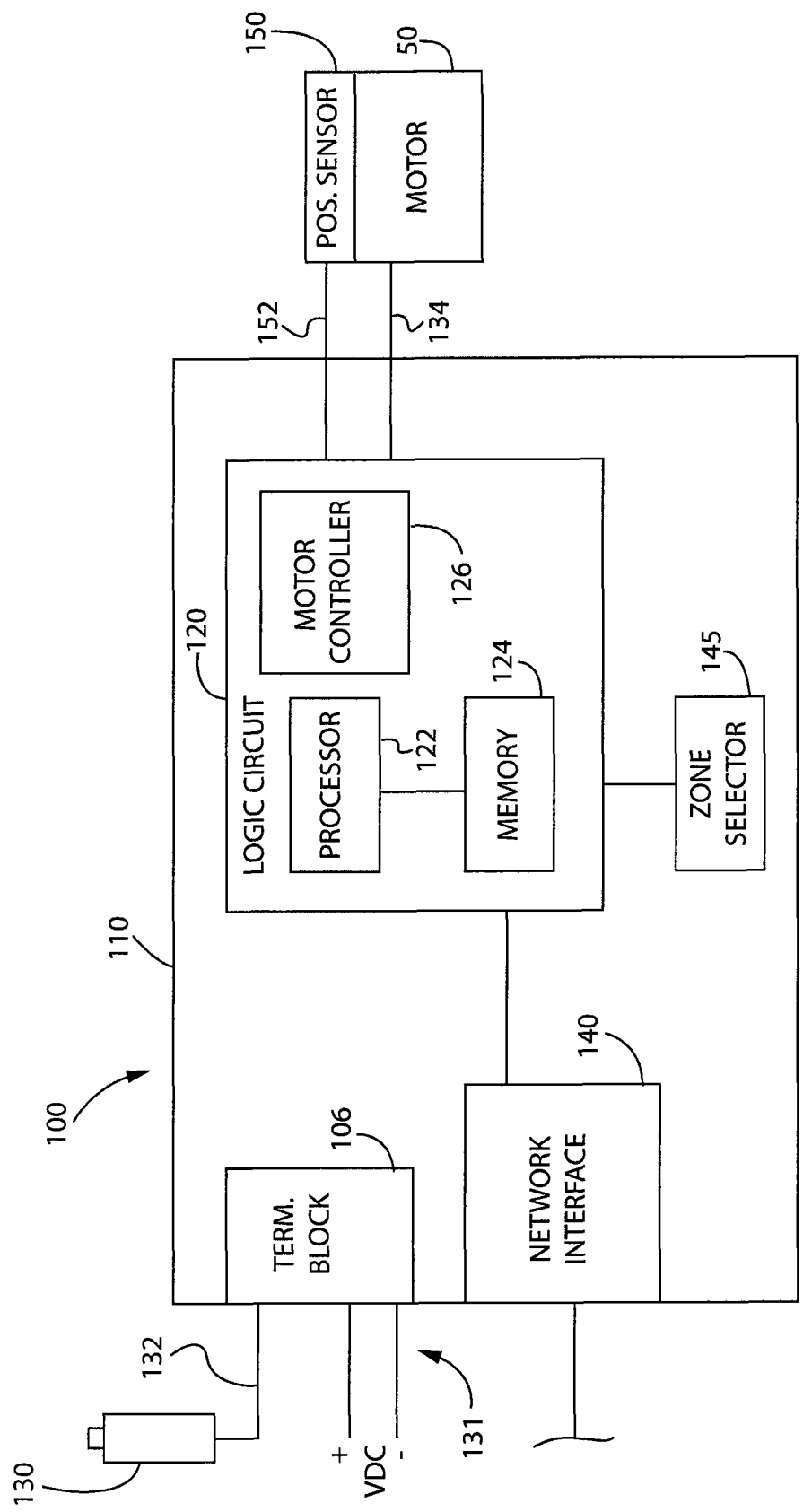
FIG. 5 is a block diagram representation of the integrated controller according to one embodiment of the invention.

As shown in detail in FIGS. 3-4, the motor 50 includes a housing 52, a stator 62, a rotor 64, an output shaft 60, and bearings 58, which may be in the form of heavy duty ball bearings. In one embodiment, the stator 62 has nine windings while the rotor 64 has eight permanent magnet poles, although it is understood that any other satisfactory configuration may be employed. Although the drive motor 50 is illustrated as having an internal rotor and an external stator, it is also contemplated that the motor 50 may be constructed to have an internal stator and an external rotor, in a manner as is known. Additionally, the motor 50 may include a rear shaft extension to allow for the addition of an external electro-mechanical brake, which may be used for sections of a conveyor assembly featuring an incline or a decline. For example, an electro-mechanical brake may be useful in the case of a power outage to the motor 50. Alternately, the motor 50 may include a one-way bearing, which prevents the rollers from spinning backwards on an inclined section of a conveyor assembly. Referring also to FIG. 5, the drive motor 50 may also include a position sensor 150 configured to generate a position signal 152 corresponding to the angular position of the rotor 64. According to the embodiment illustrated in FIG. 4, the position sensor 150 includes a first printed circuit board 66 ("PCB") with three Hall Effect sensors 68. Alternately, it is contemplated that the drive motor 50 may be constructed as a sensor-less motor in which the motor commutation is determined by the electronic components without using sensors, such as the Hall Effect sensors 68 as shown and described above.

To simplify installation and reduce wiring, the motor 50 further includes an integrated controller 100. The controller 100 is mounted to the second end 53 of the motor housing 52 and includes a cover 102 extending from the rear of the motor 50 configured to substantially enclose the controller 100. At least one opening 104 in the cover 102 is configured to receive a terminal block 106 such that the controller 100 may be connected to external devices 130. Referring again to FIG. 5, an exemplary external device 130 is illustrated, generating a feedback signal 132 to the controller 100. The external device 130 may be a proximity sensor, such as a toggle switch or an optical device, detecting the presence or absence of an object on the conveyor assembly 10. The terminal block 106 may be configured to receive any suitable electronic signal according to the application requirements, including, but not limited to, analog voltages, digital signals, or network communications. The electronic signals may be, for example, an analog speed command, signals from sensors indicating the presence or absence of a product or package on the roller conveyor, signals from adjacent zones of the conveyor indicating the presence or absence of product or package to be passed to the zone, enable and/or disable commands, a hold command, or a slug release command. In addition, the terminal block 104 is configured to receive one or more DC voltages, VDC. The DC voltage is used to provide power to the motor 50 and controller 100 and may be used directly at the voltage level, VDC, connected to the terminal block 106 or converted to another suitable voltage level. Electrical conductors 131, such as individual wires, cables, or a combination thereof are provided to conduct each of the signals input to or output from the terminal block 106.

The integrated controller 100 includes a second circuit board 110 configured to be fit within the cover 102. The terminal block 106 is mounted along an edge of the circuit board 110 such that it may be accessed via the opening 104 to connect wires to the terminals. The electronic signals received at the terminal block 106 are transmitted to a logic circuit 120 on the circuit board 110. According to one embodiment of the invention, the logic circuit 120 includes a memory device 124 configured to store a series of instructions executable on a processor 122, and processor 122 executes the instructions to control operation of the drive unit 140. A dedicated motor controller 126 may be provided to convert a reference signal from the processor 122, and the DC voltage, VDC, at the terminal block 106 into a voltage 134 provided to the motor 50 to achieve desired operation of the motor. Optionally, the motor controller 126 may be integrated within the processor 122. It is contemplated that many different configurations of the logic circuit may be realized according to the application requirements without deviating from the scope of the invention. The logic circuit may include, for example, one or more of the following electronic components: a processor, a field programmable gate array (FPGA), an application specific integrated circuit (ASIC), discrete logic circuits, buffers, memory devices (static and/or dynamic), and communication driver circuits. One of the processor, FPGA, or ASIC may receive, for example, a speed command for the drive motor 50 and generate output signals 134 to control the drive motor 50. Further, the command signal may be an analog input voltage, received at an analog to digital converter circuit and processed by the digital logic circuit, or the command signal may be a network communication, received at a network interface 140 to extract the data from the network message. The output voltage 134 to the motor may also be generated as a function of feedback signals received from the Hall Effect sensors on the first printed circuit board 66.

The integrated controller 100 may also be configurable according to the placement of the motor and controller assembly within the conveyor system. According to an exemplary embodiment, the conveyor system includes a master zone, an end of branch zone, an auxiliary zone, and one or more intermediate zones. Each zone may perform functions specific to the type of zone selected, and the terminals of the terminal block 106 may be configurable according to the type of zone selected. The controller 100 includes a zone selector 145 to configure operation of the drive unit 40 according to which type of zone the conveyor assembly 10 is desired to operate. The zone selector 145 may be, for example, a multi-position switch or a series of binary switches, such as dip switches. Additional binary switches may be provided to select, for example, the forward direction of rotation of the rollers in the zone or other operating parameters according to the system requirements. Optionally, if the logic circuit is configured for network communications, one or more setup messages may be transmitted to the controller 100 to configure operation of the controller 100.

In operation, the integrated controller 100 receives command signals and controls operation of the motor 50 and, subsequently, the rollers 25 on the conveyor assembly 10 to which it is mounted. If, for example, the integrated controller 100 and its corresponding zone is configured to be a master zone, the integrated controller 100 receives a global speed command for the branch. The speed command may be an analog voltage, for example, between 0-10 VDC, corresponding to a speed range between stopped and full speed. A master zone may similarly receive a global enable signal to start/stop operation of the branch. The master zone may further have terminals configured to output the speed command and start/stop commands to the other zones in the branch. The other zones in the branch are configured to receive the speed command and start/stop commands from the master zone. Each of the zones in the branch is configured to receive an input signal corresponding to the presence and/or absence of an object in the zone. As a function of the presence or absence of an object in the zone and in adjacent zones, the controller 100 may energize and/or de-energize the motor 50 in order to receive an object from or pass an object to an adjacent zone.

The logic circuit on the integrated controller 100 is further configured to control operation of the motor. The stator 62 includes, for example, three phases each having multiple poles. The leads of each phase are connected to the second circuit board 110 to receive a voltage corresponding to the desired operation of the motor 50. The first circuit board 66 includes three Hall Effect sensors, which are arranged on the board 66 to detect the polarity of the permanent magnets in the rotor 64 that are aligned with each phase of the stator 62. Connections between the first circuit board 66 and the second circuit board 110 conduct the signals from the Hall Effect sensors to the logic circuit on the integrated controller 100. According to known motor control techniques, the logic circuit on the integrated controller 100 generates the desired voltage to control the motor 50 responsive to the feedback signals from the Hall Effect sensors. Optionally, the logic circuit may be configured to generate the desired motor voltages according to sensorless control techniques.

Integrating the controller 100 with the motor 50 creates additional heat generation within the housing 52. As illustrated in FIG. 4, the circuit board 110 for the controller 100 is mounted to the second end 53 of the motor housing 52 by multiple stand-offs 112. Each of the stand-offs 112, second end 53 of the motor housing 52 and at least the portion of the side wall 55 of the housing 52 may be made of a heat conductive material such as aluminum. Optionally, additional heat-sinks may be arranged between the circuit board 110 and the second end 53 of the housing 52 to conduct heat from the controller 100 to the housing 52. Additionally, the stand-offs 112 and the opening 104 in the cover 102 provide paths for air circulation around the controller and in communication with the ambient environment.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

What is claimed is:

1. A roller conveyor assembly, comprising:
a plurality of rollers;
a frame including a pair of spaced apart frame members, wherein each of the rollers is rotatably mounted between the pair of frame members;
a mounting arrangement configured to mount a drive unit to one of the pair of frame members; and the drive unit, comprising:
- a motor, including:
  - a stator configured to receive an applied voltage,
  - a rotor configured to rotate as a function of the applied voltage,
  - a motor housing containing the stator and the rotor, wherein the motor housing has a first end, a second end opposite the first end, and a side wall extending between the first and second ends, and
  - an output shaft operatively connected to the rotor and extending through an opening in the first end of the motor housing; and
- a controller including:
  - a circuit board mounted to an outer surface of the motor housing, the circuit board including a logic circuit configured to control operation of the motor,
  - a terminal block mounted to the circuit board and configured to receive a plurality of electrical conductors transmitting at least one of an input and an output signal to the logic circuit, and
  - a cover connected to the motor housing, wherein the cover in combination with the motor housing encloses the circuit board, wherein the cover has an opening providing access to the terminal block.

2. The roller conveyor assembly of claim 1 wherein the circuit board of the controller is mounted to the outer surface of the second end of the motor housing and wherein the second end of the motor housing is configured to be a heat sink for the logic circuit.

3. The roller conveyor assembly of claim 1 further comprising at least one flexible drive member operatively connected between the output shaft and one of the rollers.

4. The roller conveyor assembly of claim 3 wherein:
- the drive unit includes a sheave mounted to the output shaft;
- the sheave includes at least one groove, each groove configured to receive one of the flexible drive members; and
- at least one roller includes a groove configured to receive one of the flexible drive members.

5. The roller conveyor assembly of claim 1, wherein the inputs on the terminal block are configured to receive a command signal and wherein the logic circuit is configured to selectively provide the voltage to the motor responsive to the command signal.

6. The roller conveyor assembly of claim 1 wherein the motor further includes a position sensor generating a position signal corresponding to an angular position of the motor and wherein the position signal is provided to the logic circuit for control of the motor.

7. A conveyor drive unit for a roller conveyor assembly, the roller conveyor assembly including a plurality of rollers mounted between a pair of spaced apart frame members, the conveyor drive unit, comprising:
- a motor housing having a first end, a second end, and a side wall extending between the first end and the second end;
- a motor operatively mounted within the motor housing, the motor including an output shaft extending from a first end of the motor housing;
- a controller mounted to the second end of the motor housing, wherein the controller is configured to control operation of the motor and wherein the second end of the motor housing is configured to provide a heat sink for the controller; and
- a cover connected to the second end of the motor housing, wherein the cover in combination with the motor housing encloses the controller.

8. The conveyor drive unit of claim 7 wherein the controller further comprises:
- a circuit board, wherein the circuit board is mounted to the second end of the motor housing;
- a terminal block mounted on the circuit board, wherein the terminal block is aligned with an opening in the cover and configured to transmit at least one of an input signal and an output signal between the controller and another device;
- a memory device mounted to the circuit board and configured to store a plurality of instructions; and
- a processor configured to execute the plurality of instructions to control operation of the motor.

9. The conveyor drive unit of claim 8 wherein the roller conveyor assembly is configurable to operate in one of a plurality of modes and the conveyor drive unit further comprises a selector configured to generate a signal corresponding to the operating mode.

10. The conveyor drive unit of claim 8 further comprising a network interface connected in series between a network connector and the processor, wherein the terminal block is the network connector and the input and output signals are transmitted via network messages.

11. The conveyor drive unit of claim 8, wherein the terminal block includes at least one terminal configured to receive a command signal, and wherein the processor executes a motor control module to generate a voltage signal to control operation of the motor responsive to the command signal.

12. The conveyor drive unit of claim 7 further comprising at least one flexible drive member operatively connected between the output shaft and one of the rollers.

13. The conveyor drive unit of claim 12 wherein:
- the drive unit includes a sheave mounted to the output shaft;
- the sheave includes at least one groove, each groove configured to receive one of the flexible drive members; and
- at least one roller includes a groove configured to receive one of the flexible drive members.

14. A conveyor drive unit for a roller conveyor assembly, the roller conveyor assembly configured to be installed in a conveyor system having a plurality of roller conveyor assemblies and including a plurality of rollers mounted between a pair of spaced apart frame members, the conveyor drive unit comprising:
- a housing including a motor housing portion, a controller housing portion, and a mounting means for securing the housing to a mounting bracket positioned below the rollers;
- a motor operatively mounted within the motor housing portion, the motor having an output shaft extending from one end of the housing; and
- a controller mounted to the motor housing and enclosed between the controller housing portion and the motor housing portion including:
  - a first input configured to receive a DC voltage;
  - a second input configured to receive a command signal; and
  - a logic circuit configured to selectively provide the DC voltage to the motor as a function of the command signal.

15. The conveyor drive unit of claim 14 further comprising at least one additional input configured to receive a feedback signal from a sensor detecting an operating condition corresponding to the roller conveyor assembly on which the controller is mounted.

16. The conveyor drive unit of claim 15 further comprising a third input configured to receive a signal from another roller conveyor assembly in the conveyor system.

17. The conveyor drive unit of claim 16 further comprising a network interface wherein each of the second and third inputs is received via the network interface.

18. The roller conveyor assembly of claim 1 wherein the terminal block is configured to receive at least one input voltage used to provide power to the motor and the controller further includes a power converter mounted to the circuit board configured to convert the input voltage to the output voltage to control operation of the motor.

\* \* \* \* \*